Nov. 27, 1962  A. ALFORD  3,066,291
ANTENNA STRUCTURE AND SYSTEM
Filed June 20, 1960  5 Sheets-Sheet 1

INVENTOR
Andrew Alford
BY
Morse & Altman
ATTORNEYS

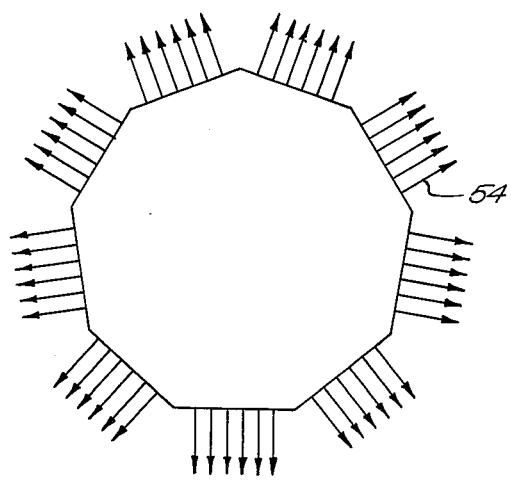
F I G. 3
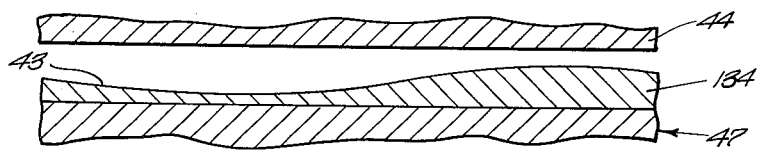
F I G. 5
F I G. 9

Nov. 27, 1962  A. ALFORD  3,066,291
ANTENNA STRUCTURE AND SYSTEM
Filed June 20, 1960  5 Sheets-Sheet 5

INVENTOR
Andrew Alford
BY
Morse & Altman
ATTORNEYS

United States Patent Office 3,066,291
Patented Nov. 27, 1962

3,066,291
ANTENNA STRUCTURE AND SYSTEM
Andrew Alford, 71 Bacon St., Winchester, Mass.
Filed June 20, 1960, Ser. No. 37,286
21 Claims. (Cl. 343—106)

The present invention relates to antenna structures and systems and, more particularly, to an antenna structure for generating a rotating radiation pattern that is useful, for example, in a radio aerial navigational system.

The antenna construction of the present invention is described herein in conjunction with a so-called Tectical Air Navigation or Tacan system. As is well known, a Tacan beacon, by generating a rotating radiation pattern, provides an aircraft in its vicinity with a polar coordinate indication of location in terms of bearing and distance from the Tacan beacon. The aircraft carries a transmitter-receiver system (1) that is capable of determining the elapsed time between an interrogate pulse transmitted from the airplane and a delay pulse returned from the Tacan beacon in order to indicate distance and (2) that is capable of analyzing a waveform generated by the rotating radiation pattern in order to indicate bearing. Difficulties have been encountered in providing simple but effective antenna constructions capable of generating rotating radiation patterns of predetermined configuration throughout wide elevation angles.

The primary object of the present invention is to provide a novel antenna construction, of unusual simplicity and efficacy, of the foregoing type in which antenna means are disposed along a distribution of waveguide connectors and, in communication therewith, is a waveguide region defined by a conducting stationary surface and a conducting rotating surface, the rotating surface being provided with modifying means moving with the rotating surface for differentially affecting radiant energy being propagated from within the waveguide region toward the distribution of waveguide connectors.

Other objects of the present invention are to provide a novel antenna construction of the foregoing type, in which: the modifying means is shaped so as to differentially reduce the impedance of localized portions of the waveguide region, thereby to differentially increase the intensity of energy directed toward sequentially selected waveguide connectors; and the modifying means is constituted by dielectric elements moving with the rotating surface within the waveguide region so as to differentially reduce the propagation velocity of energy in localized portions of the waveguide region, thereby to retard the phase of energy directed toward sequentially selected waveguide connectors.

Further objects of the present invention are: to provide a novel antenna construction of the foregoing type, comprising an inlet waveguide connector presenting a conducting inner surface and a conducting outer surface, the inner surface communicating with the aforementioned rotating surface and the outer surface communicating with the aforementioned stationary surface; and to provide a Tacan system incorporating an antenna construction of the foregoing type.

Still other objects of the present invention will in part be obvious and will in part appear hereinafter.

For a fuller understanding of the nature and objects of the present invention, reference should be had to the following detailed description taken in connection with the accompanying drawings, wherein:

FIG. 3 is a diagram illustrating other features of the radiation pattern generated by the system of FIG. 1;

FIG. 5 is a developed view of one of the components of the scanner of FIG. 2;

FIG. 9 is a developed view of one of the components of the scanner of FIG. 8.

Figure 1:
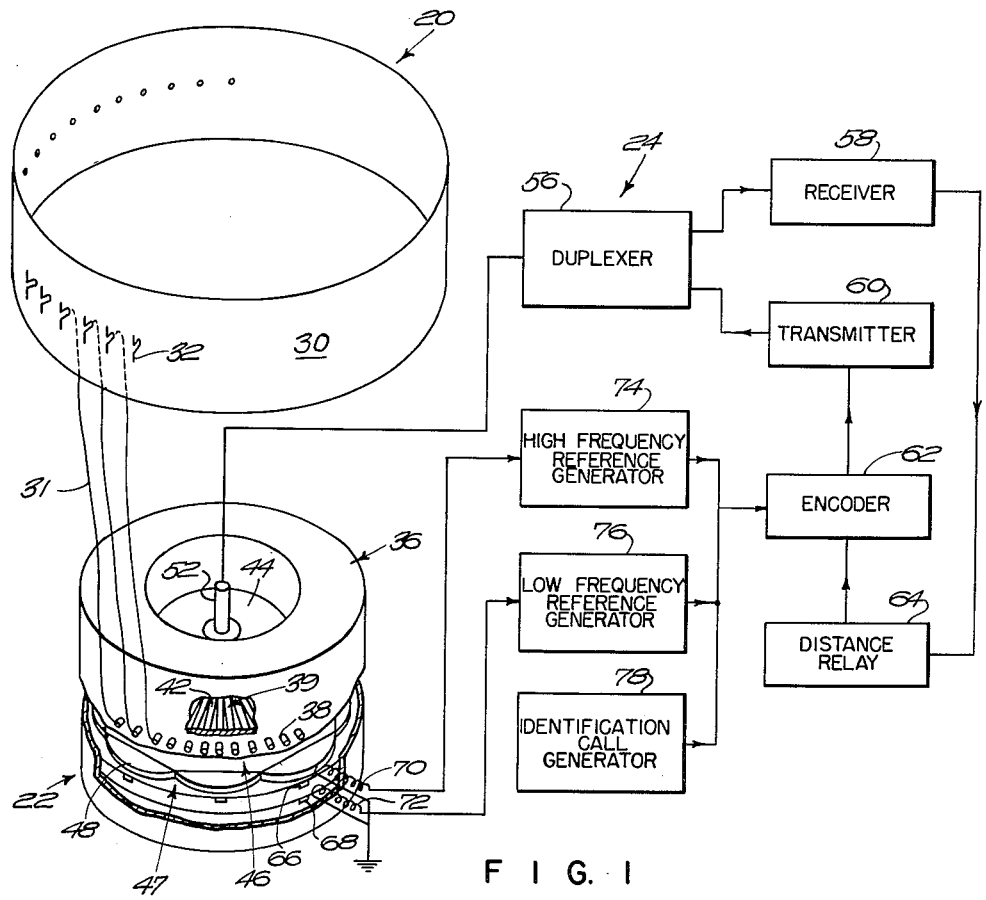
FIG. 1 is a diagrammatic view, partly in exploded, exaggerated perspective and partly in block diagram, of a Tacan system embodying an antenna construction, including an antenna and a scanner, of the present invention.
Figure 2:
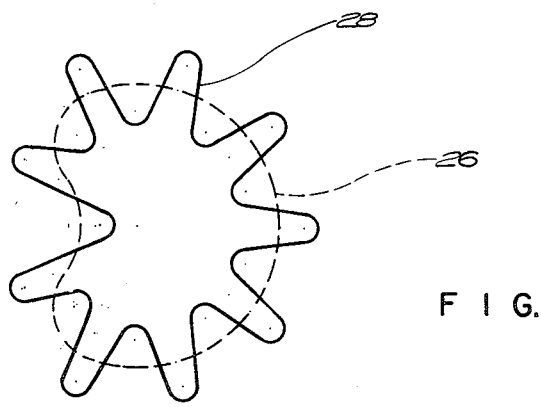
FIG. 2 is a diagram illustrating certain features of the radiation pattern generated by the system of FIG. 1.

The radiation pattern generated by the Tacan system of FIG. 1 is illustrated in FIG. 2 as being in the conventional form of a limacon having superimposed ripples. Rotation of the limacon would generate in an airborne receiver a signal varying in strength as a function of time. The signal would undergo a single cycle of a sine (more accurately sine-like) wave with a single rotation of the limacon, the frequency of rotation of the limacon being arbitrarily chosen as 15 cycles per second. It is apparent that if the airborne receiver receives a reference pulse at the moment when the maximum (or the minimum) of the limacon is oriented in some predetermined direction (say due North), a determination of the phase of the sine wave at that moment will serve to indicate bearing. However, if a simple limacon pattern of this type were employed, errors would tend to result from the coarseness of the phase measuring circuits of the airborne receiver and site effects by which topographical and meteorological phenomena tend to disturb the limacon pattern. The superposed ripples, arbitrarily chosen at nine, are intended to obviate such errors. These ripples may be detected in the airborne receiver as a 135 cycle per second signal. Each of these ripples is associated with its own reference pulse with respect to which its phase may be determined. Although the phase of the 135 cycle per second signal may be determined more accurately than the phase of the 15 cycle per second signal because it is not appreciably subject to the aforementioned errors, the 135 cycle per second signal has a ninefold ambiguity insofar as determining bearing is concerned. In result, therefore, the 15 cycle per second signal is present to resolve this ambiguity.

Generally the system illustrated herein as embodying the present invention, as shown in FIG. 1, comprises a stationary antenna 20 that generates a radiation pattern, a scanner 22 that determines the pattern of energy fed to antenna 20 and a control system 24 that applies energy to the scanning system. The radiation pattern generated by antenna 20 is of the type shown in FIG. 2 as having a configuration characterized by a limacon 26 upon which are superimposed nine ripples 28. This configuration, when rotated in the manner to be described below, is suitable for use in a Tacan system of the aforementioned type. Antenna 20 comprises a tubular metallic reflector 30 having a vertical axis. Disposed at equal intervals around the circumference of reflector 30 is a series of vertically oriented dipoles 32. Dipoles 32, which are suitably insulated from reflector 30, are spaced at a quarter wavelength therefrom at the operating frequency and are fed through suitable coaxial cables 31 from scanner 22.

Scanner 22, to be described now in reference to FIGS. 1, 2 and 3 generally and to be described below in reference to FIGS. 4, 5, 6 and 7 specifically, includes a housing 36 of generally cylindrical shape, the periphery of which is provided with a sequence of equidistant coaxial outputs 38. Outputs 38 are connected respectively to antenna dipoles 32 by coaxial cables 31 as stated above. Associated with the inner conductors of coaxial outputs 38 is a stator 39 including a plurality of radial conductors 42 radially extending outwardly from a medial annular conductor 44. Annular conductor 44 and radial conductors 42 provide lower faces which define, in conjunction with the parts of a rotor 47, now to be described, a waveguide region 46 similar in shape to the hub and spokes of a wheel. Rotor 47, as will be seen in greater detail in FIGS. 4 and 5, includes an annular conductor 43, generally parallel and adjacent to the lower faces of stator 39, and a sequence of dielectric elements 48 carried by the rotor at its periphery. Dielectric elements 48, which in the cross-section perpendicular to the axis of rotor 47 are plano-convex in configuration, are carried by rotor 47 and are contiguous with radial conductors 42 so that energy directed from within waveguide region 46 must pass therethrough. The upper surface of annular conductor 43 is shaped to vary angularly in distance from the inner surface of annular conductor 44 in accordance with the function $a+b \cos \theta$, where $\theta$ is the angle of rotation of rotor 47 and $a$ and $b$ are constants. The angle varies between 0 and 360° and the constants, which depend upon the geometrical relationships and the electrical properties of the upper surface of annular conductor 43 and the inner surface of annular conductor 44, can be determined empirically. Along any radial line, however, the spacing between the adjacent surfaces of annular conductor 43 and annular conductor 44 is constant. Radio frequency energy is applied to waveguide region 46 through an input waveguide connector 52, the inner conductor of which communicates with the inner surface of annular conductor 43 and the outer conductor of which communicates with the inner surface of annular conductor 44. In consequence of the foregoing structure, radio frequency energy applied through input connector 52, is propagated outwardly through waveguide region 46 in such a way as to be varied angularly in intensity and to be altered angularly in phase. The angular variation in intensity which is due to the shape of the surface of annular conductor 43, results in the minimum in the limacon pattern 26 of FIG. 2. The angular variation in phase which is due to the shape of dielectric elements 48 results in the nine plane wave fronts shown at 54 in FIG. 3 and, consequently, the nine ripples 28 in the limacon pattern of FIG. 2.

As indicated above, the foregoing antenna and scanning systems are useful in a variety of applications, one of which is a Tacan system of the type generally shown in FIG. 1. This system includes a duplexer 56 for transmitting signals between coaxial connector 52 and a receiver 58 and transmitter 60. In conventional fashion, this energy is in the form of short pulses of radio frequency controlled by an encoder 62, these pulses being of amplitudes conforming to an envelope of the type illustrated at 28 in FIG. 2. A distance reply generator 64, which is triggered by receiver 58, after a fixed delay produces an output that is applied to encoder 62 for transmission from transmitter 60 through duplexer 56 and waveguide region 46 to antenna 20.

As indicated above, an airborne Tacan receiver will detect a waveform having 15 cycle per second and 135 cycle per second components. In order to evaluate these components, it is necessary to provide reference pulses that occur at times when the radiation pattern is at particular orientations. In order to generate reference pulses of this type, rotor 47 is provided with a series of nine magnetic slugs 66, equidistantly spaced around its periphery in an upper plane and a single magnetic slug 68 positioned at one point on the periphery of the rotor in a lower plane. In association with slugs 66 is a single coil 70, which generates a pulse when instantaneously in association with any one slug 66. Similarly, in association with slug 68 is a single coil 72, which generates a pulse when instantaneously in association with slug 68. It is apparent that the nine equally spaced pulses produced in coil 70 and the single pulse produced in coil 72 during each revolution of rotor 47, occur at particular orientations of the radiation pattern of FIG. 3. The pulses from coil 70 are applied to a high frequency reference generator 74 and the pulses from coil 72 are applied to a low frequency reference generator 76. Reference generator 74 and reference generator 76, together with an identification call generator 78 that generates Morse Code indications of the particular beacon location, are applied to encoder 62 in conventional fashion.

Figure 4:
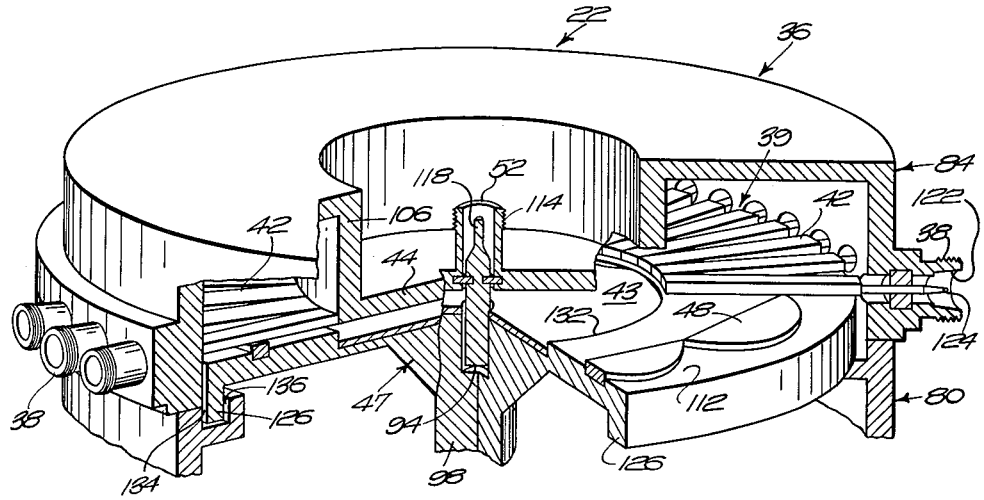
FIG. 4 is an exaggerated perspective view of the scanner of the antenna construction of FIG. 1.
Figure 6:
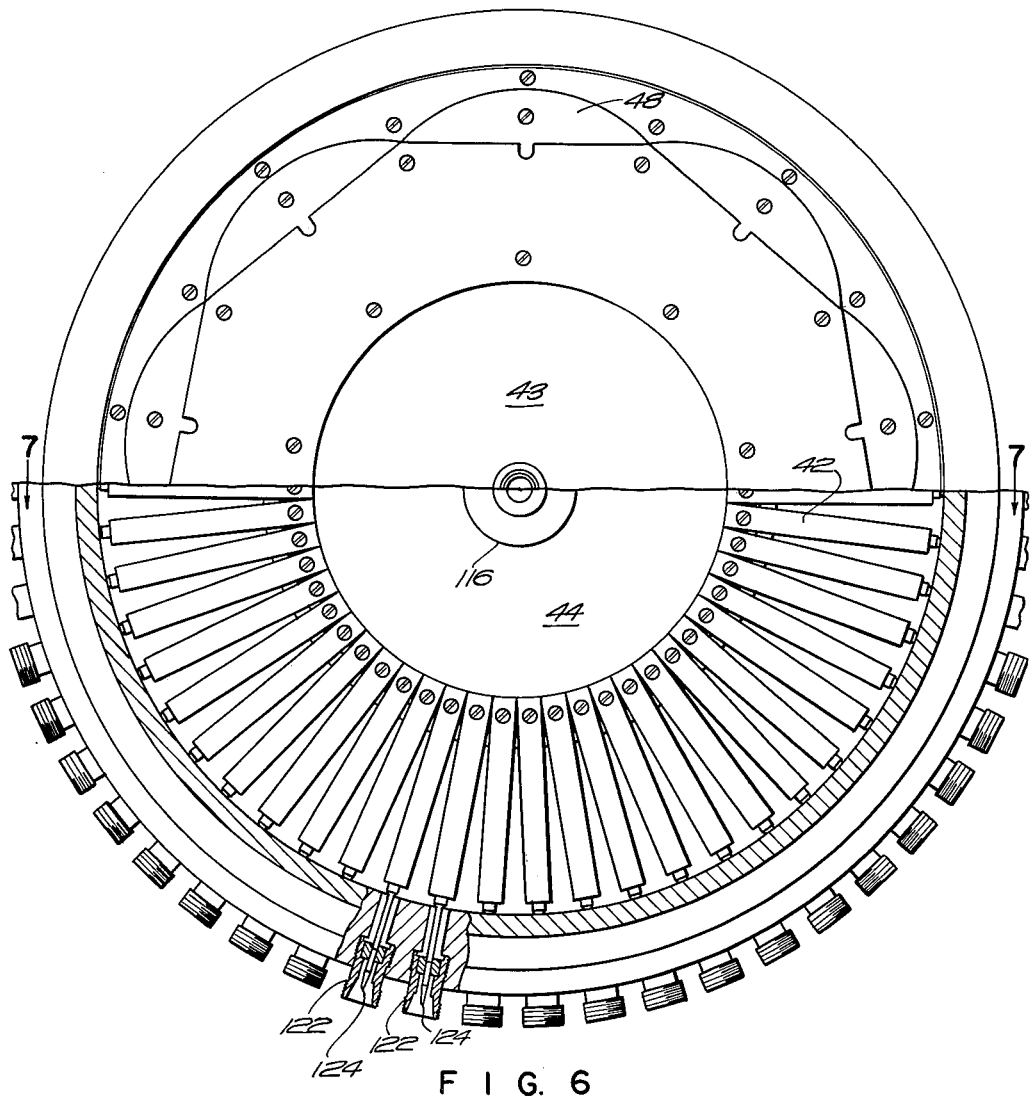
FIG. 6 is a top plan detail view partly broken away of the scanner of the system of FIG. 1.
Figure 7:
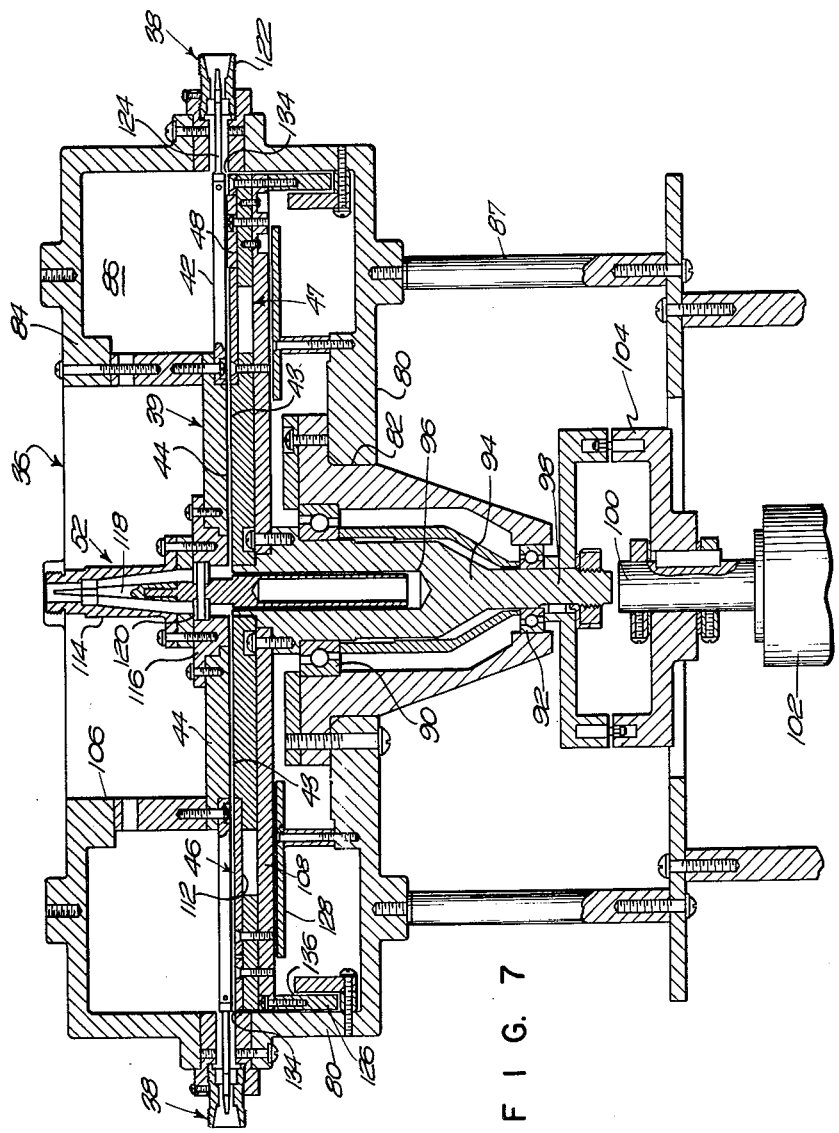
FIG. 7 is a cross-sectional view of the scanner of FIG. 6, the section being taken substantially along the lines 7—7.

Scanner 36 is illustrated in limited detail in FIGS. 4 and 5 for the purpose of showing the relations among the parts and in great detail in FIGS. 6 and 7 for the purpose of showing the structure of the parts. First, with reference to FIGS. 4 and 5, scanner 22 comprises, as is indicated above, housing 36, stator 39 including annular conductor 44 and radial conductors 42, rotor 47, including annular conductor 43 and dielectric lens elements 48, coaxial output connectors 38 and coaxial input connector 52. As shown, housing 36 includes a lower casing 80 in the form of a dish that is centrally apertured at 82 and an upper casing 84 in the form of an inverted annular channel defining a toroid-like chamber 86. Lower casing 80 is mounted on a suitable support 87. Projecting through and attached within central aperture 82 of lower casing 80 is a journal that is provided with an upper bearing 90 and a lower bearing 92. Received by bearings 90 and 92 is a spindle 94 that is provided with an upwardly open bore 96 and a downwardly extending shaft 98. Shaft 98 is secured to the output shaft 100 of a motor 102 by a universal coupling 104.

Affixed to the inner depending rim 106 of upper casing 84 is medial annular conductor 44, from the periphery of which extend radial conductors 42. Affixed to the upper extremity of spindle 94 is a centrally apertured disk mount 108. Carried by disk mount 108 is rotor 47, which includes annular conductor 43, hereinafter termed inner annular conductor, and an outer annular conductor 112. The upper surface of inner annular conductor 43 is shaped as indicated above. Outer annular conductor 112 securely positions dielectric elements 48 within waveguide region 46. Waveguide region 46 feeds energy from coaxial input 52 to coaxial outputs 38.

Input connector 52 includes: an outer conductor in the form of an external conducting tube 114, which is secured to annular conductor 44 by means of an adapter 116; and an inner conductor 118 in the form of an internal conducting rod, which is mounted on and projects through an insulator 120. Inner conductor 118, which projects into bore 96, is sufficiently close thereto to provide an effective radio frequency shunt for a purpose to be explained below. Each of output connectors 38 includes: an outer conductor 122 in the form of an external tubelet, which is positioned between upper casing 84 and lower casing 80; and an inner conductor 124 in the form of an internal stub rod, which is continued from an associated radial conductor 42. The waveguide regions defined within output connectors 38 communicate with waveguide region 46. A rim 126, which depends from the disk mount 108, is sufficiently close to casing 80 to provide an effective radio frequency shunt for a purpose to be explained below. And an annular conductor 128, which is contiguous to the undersurface of disk mount 108, is sufficiently close thereto to provide an effective radio frequency shunt.

The operation of the structure of FIGS. 6 and 7, now will be described with primary reference to FIG. 4. The input potential on inner conductor 118 of input connector 52 is applied to annular conductor 43 through the rotary joint provided by the downward extension of inner conductor 118 and bore 96. The extension and the bore are coextensive for a length of one-quarter-wave length at the center frequency of the operating frequency band and the width of the gap therebetween is sufficiently small so that the characteristic impedance of the rotary joint is of the order of 10 ohms or less. Since outer conductor 114 is joined directly to inner annular conductor 44, the difference of potential between inner conductor 118 and outer conductor 114, except for a small drop across the rotary joint, appears between inner annular conductor 44 and annular conductor 43. This difference of potential excites transverse electromagnetic waves which propagate radially outwardly toward the outer periphery 132 of the space bounded by annular conductor 44 and annular conductor 43. This radially diverging wave does not stop at periphery 132 but continues to propagate substantially without reflection between the outer annular conductor 112 and radial conductors 42. For a scanner of this type designed to operate at a frequency of around 1000 mc., the maximum step between inner annular conductor 43 and outer annular conductor 112 is approximately 0.1 inch. The reflections introduced by this discontinuity have been found not to be detrimental. The spacing between radial conductors 42 and outer annular conductor 112 is small in comparison with the spacing between radial conductors 42 and other conductors in the scanner. The result is that substantially all of the energy is concentrated between radial conductors 42 and increments of outer annular conductor 112 immediately adjacent thereto, except for minor losses due to fringing and the very low field between radial conductors 42 and upper casing 84. The potential between radial conductors 42 and outer annular conductor 112 is applied substantially without loss between inner conductors 124 and outer conductors 122 of connectors 38. A small drop of potential is developed across air gap 134 between rim 126 of rotor 47 and lower casing 80. This drop of potential can be rendered negligible by choosing the length of the gap, as measured in a radial plane containing the axis of the scanner to be equal to a quarter-wave-length, provided that the inner extremity 136 of gap 134 opens into a non-resonant cavity of very large dimensions in comparison with the very small width of gap 134. The length of the radial waveguide path between the inner and outer peripheries of the annular space bounded by annular conductor 43 and of the annular conductor 44 is chosen to be approximately one-quarter wavelength long at the arithmetic mean frequency of the operating frequency band.

In order to obtain a mental picture of the propagation phenomena in the inner waveguide region between annular conductors 43 and 44, it is convenient to think of this waveguide region as including a multitude of radial waveguides all connected in parallel with each other at their inner ends and all terminated by like impedances at their outer ends, approximately a quarter wavelength away at the center frequency of the operating frequency band. When the characteristic impedance of a particular waveguide is $Z_0$, the input impedance to that waveguide is $Z_0^2/U$. $U$ is the impedance to which the output is applied. Radial waveguide sectors of narrow spacing present lower impedances to the input potential than radial waveguide sectors of wide spacing. For this reason, the radial waveguide sectors of narrow spacing receive not only more current but a greater proportion of the input power. As rotor 47 turns, the voltage developed across a matched load fed by an output connector 38 varies in accordance with the function $a_1 + b_1 \cos \theta$, where $\theta$ is the angle of rotation and $a_1$ and $b_1$ are constants.

The outer waveguide region between radial conductors 42 and outer annular conductor 112 also may be described as a plurality of radial waveguides. Radial conductors 42 are spaced at fixed distance above the flat surface of the outer annular conductor 112. A plurality of dielectric plano-cylindrical lenses 48 of uniform thickness are carried by outer annular conductor 112 at equal intervals along the circumference of rotor 47. The addition of dielectric material to the waveguide space decreases its characteristic impedance. To maintain the characteristic impedance throughout the waveguide region independent of this dielectric material, the spacing between radial conductors 42 and the outer annular conductor 112 in the vicinity of any dielectric material is increased. In effect, lenses 48 are countersunk into outer annular conductor 112. In portions of the outer waveguide region containing dielectric lenses 48, the high dielectric constant of these lenses decreases the velocity of propagation of the waves. Since these dielectric lenses are of uniform thickness and of greater width than radial conductors 42, the relative phase delay imparted to the energy along each radial waveguide increment is directly proportional to the length of the dielectric material in the direction of propagation. When, for example, nine dielectric lenses, of plano-convex cross-section in the plane parallel to the direction of energy propagation, are equally spaced on outer annular conductor 112, the relative phase of the current delivered to any coaxial connector 38 varies from a maximum value to a minimum value nine times as rotor 47 turns 360°. In effect, the electrical lengths of the radial waveguide increments of the outer waveguide region vary by virtue of the presence of dielectric lenses 48. The mean electrical length is approximately one-quarter wavelength at the center frequency of the operating band and the relative phase delay imparted by the dielectric lenses should be limited to about ± one-eighth of a wavelength in order to prevent the electrical length of any radial waveguide increment from being equal to a half-wavelength.

The diameter of rotor 47 is 13 inches for a scanner 22 designed for operation at a center frequency of 1000 megacycles. The spacing between annular conductor 43 and annular conductor 44 varies from 0.11 inch to 0.21 inch for such a scanner. The width of the toroidal cavity above radial conductors 42 is 2.8 inches and the height of this cavity above radial conductors 42 is 2.1 inches. With a material having a dielectric constant of 15, the dielectric lenses 48 are 0.2 inch thick and are recessed 0.1 inch below the surface of the outer annular conductor 112.

Figure 8:
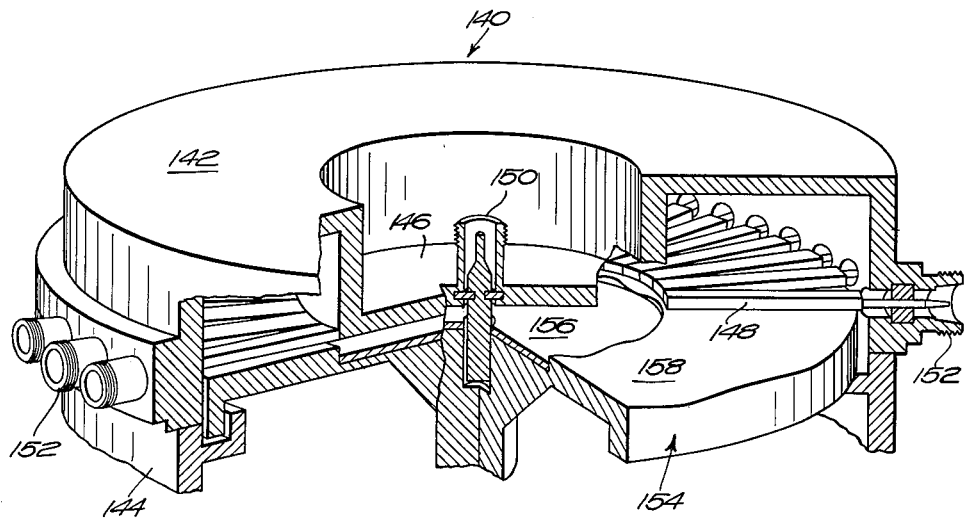
FIG. 8 is an exaggerated perspective view of an alternative scanner embodying the present invention.

Another scanner embodying the present invention is shown at 140 in FIG. 8. Scanner 140 comprises an upper casing 142, a lower casing 144, a stator including an annular conductor 146 and a plurality of radial conductors 148, an input connector 150 and a plurality of output connectors 152, all identical to their counterparts in the embodiment of FIGS. 1 through 7.

Scanner 140 further comprises a rotor 154 which is identical to its counterpart of FIGS. 1 through 7 except as follows. Rotor 154 includes an inner annular conductor 156 as developed in FIG. 5. Rotor 154 includes an outer annular conductor 158 that has the angular configuration as developed in FIG. 9. The upper surface of outer annular conductor 158, therefore, is undulated along any angular arc but is straight along any radial line. The spacing along any angular arc between outer annular conductor 158 and the plane of radial conductors 148 varies in accordance with the function $a_2 + b_2 \cos 9\theta$, where $\theta$ is the angle of rotation and $a_2$ and $b_2$ are constants. The radial width of outer annular conductor 158 is approximately one-quarter wavelength at the arithmetic mean frequency of the operating frequency band. The effect of the undulated surface of outer annular conductor 158 on energy propagation in the radial waveguide increments is similar to the effect of the varying spacing between inner annular conductor 156 and annular conductor 146. When the coaxial connectors 38 are terminated by like impedances, more current is delivered to the radial waveguide increments associated with small spacings than to radial waveguide increments associated with large spacings.

As rotor 154 turns 360°, the amplitude of the voltage developed across the conductors of the output connectors has a first component varying slowly through one cycle, approximately in accordance with the function $a_1 + b_1 \cos \theta$, and a second component superimposed thereon varying rapidly through nine cycles, approximately in accordance with the function $a_2+b_2 \cos 9\theta$. The one cycle variation is effected by the variable thickness of inner annular conductor 156 and the nine cycle variation is effected by the the variable thickness of the outer annular conductor.

The concept that the waveguide region consists of a plurality of ordinary radial waveguides obviously is not rigorously correct because there are no radial walls. Nevertheless, the conclusions derived from this concept are at least qualitatively correct. For best operation, several dimensions of the illustrated constructions have been specified as being approximately equal to one-quarter wavelength at the center frequency of operating frequency band. The illustrated constructions, however, are operative as long as any dimension specified as being a quarter-wavelength is not equal to within, say, one-eighth wavelength, of a half wavelength or multiple thereof.

It will be understood that certain features of the foregoing scanning system may be employed separately for special purposes. Thus, for example, the dielectric modifying arrangement may be employed for the purpose of achieving variations in phase retardation in accordance with alternative predetermined functions. And, for example, the conductor modifying arrangement may be employed for the purpose of achieving a plurality of maxima and minima, the amplitude of the radiation pattern envelope at various angular directions being determined by the degree of construction of the waveguide region.

Since certain changes may be made in the above construction and system without departing from the scope of the invention herein involved, it is intended that all matter contained in the above description or illustrated in the accompanying drawings shall be interpreted in an illustrative and not in a limiting sense.

What is claimed is:

1. An antenna system comprising an antenna component and a scanning component, said antenna component including a tubular reflector and a plurality of antennas affixed thereto therearound, said scanning component including a stator presenting first conducting surface increments including a medial conducting increment and a plurality of elongated conducting increments extending radially outward therefrom, and a rotor presenting second conducting surface increments including increments superposed on said first conducting surface increments, said first conducting surface increments and said second conducting surface increments defining therebetween a waveguide region, a plurality of waveguide connectors communicating with said plurality of antennas, said plurality of waveguide connectors communicating with a plurality of increments of said waveguide region defined by said plurality of elongated increments of said first conducting surface increments and said second conducting surface increments.

2. The antenna system of claim 1 wherein said rotor carries a dielectric configuration within a portion of said waveguide region.

3. The antenna system of claim 1 wherein said second conducting surface increments include increments at varying distances from said first conducting surface increments.

4. The antenna system of claim 1 wherein said tubular reflector has an axis and said antennas are dipoles aligned with said axis.

5. The antenna system of claim 1 wherein said rotor carries a dielectric configuration throughout its periphery within said waveguide region, said configuration including a sequence of elements each outwardly convex in a plane perpendicular to the axis of the rotor.

6. An antenna system comprising an antenna component and a scanning component, said antenna component including a tubular reflector and a plurality of antenna means affixed thereto therearound, said scanning component including a stator and a rotor, said stator presenting first conducting surfaces including a medial metallic increment and a plurality of elongated increments extending radially outwardly therefrom, said rotor presenting second conducting surfaces including increments which are at different distances from said first surfaces, said first surfaces and said second surfaces defining therebetween a waveguide region, and dielectric means carried by said rotor within said waveguide region.

7. A Tacan system comprising an antenna component, a scanning component and a control component, said antenna component including a tubular reflector and a plurality of antennas affixed thereto therearound, said scanning component including a stator presenting a medial conducting surface increment and a plurality of elongated conducting surface increments extending radially outwardly therefrom, and rotor presenting medial surface increments of said stator, said surface increments defining a waveguide region, and dielectric means within said waveguide region carried by said rotor, said control component including duplexing means for transmitting signals to and from said waveguide region, receiver means for transmitting signals from said duplexing means, distance reply means responsive to signals from said receiver means, encoding means for altering the character of signals generated by said distance reply generating means, high frequency generator means for directing a signal to said encoding means in response to particular orientations of said rotor and low frequency generator means for directing a signal encoding means in response to a single orientation of said rotor.

8. The Tacan system of claim 7 wherein said surface increments of said rotor are integral therewith.

9. The Tacan system of claim 7 wherein said dielectric means are disposed throughout the periphery of said rotor.

10. The Tacan system of claim 7 wherein said dielectric means are in the form of lenses that are outwardly convex with respect to the axis of said rotor.

11. The Tacan system of claim 7 wherein said duplexing means is connected to said waveguide region at the axis of said rotor.

12. The Tacan system of claim 7 wherein said scanning component produces a radiation pattern characterized by a limacon having superposed ripples.

13. A system comprising an antenna and a rotor, said antenna including a tubular metallic reflector, a series of antenna elements positioned in sequence therearound and a series of waveguide connectors communicating with said antenna elements, said rotor including a base, a stator affixed to said base, said stator including means presenting a medial metallic surface portion and means presenting a plurality of elongated metallic surface portions extending radially therefrom, a rotor journaled on said base, said rotor presenting conducting surface portions defining with the conducting surface portions of said stator a waveguide region, an input connector having a pair of stationary input terminals, a surface of one of said input terminals being radio frequency coupled to said conducting surface portions of said rotor, a surface of the other of said input terminals being radio frequency coupled to said conducting surface portions of said stator, a plurality of output connectors on said base communicating with said waveguide connectors, each of said output connectors including a pair of stationary output terminals, a surface of one of said output terminals being radio frequency coupled to said conducting surface portions of said rotor, means carried by said rotor in said waveguide region for modifying energy directed therethrough from said input connector to the output connectors, and means for driving said rotor continuously.

14. The system of claim 13 wherein the modifying means is constituted by certain surface portions of said rotor, said certain surface portions of said rotor, varying in distance from said surface portions of said stator.

15. The system of claim 14 wherein the modifying means is constituted by a series of dielectric lenses at the periphery of said rotor within said waveguide region, each of said lenses being outwardly convex in the cross-section perpendicular to the axis of said rotor.

16. A scanner for use in conjunction with an antenna including a tubular metallic reflector, a series of antenna elements positioned in sequence therearound and a series of waveguide connectors communicating with said antenna elements, said scanner having an axis and including a casing, a first annular conductor mounted in said casing normal to and concentric with said axis, a plurality of radial conductors mounted in said casing normal to and along directions intersecting said axis, a spindle mounted for rotation in said casing, the axis of said spindle coinciding with said axis of said casing, a second annular conductor mounted on said spindle for rotation therewith, the inner surface of said second annular conductor being adjacent to the inner surface of said first annular conductor in order to provide a waveguide region, said inner surface of said second annular conductor being shaped so that different portions thereof are at different distances from said inner surfaces of said first annular conductor, a third annular conductor mounted on said spindle concentrically with said second annular conductor for rotation therewith, a modifying means on said third annular conductor for controlling energy radiating outwardly from said axis of said casing through said waveguide region.

17. The scanner of claim 15 wherein said modifying means is an undulated surface presented to said waveguide region by said third annular conductor.

18. The scanner of claim 15 wherein said modifying means is constituted by a series of dielectric lenses at the outer periphery of said third annular conductor, each of said lenses being outwardly convex in the cross-section perpendicular to the axis of said rotor.

19. An antenna construction comprising a distribution of antenna means operatively connected to a distribution of outlet means and wave guide means defining a wave guide region communicating with said outlet means, said wave guide means presenting a stationary surface and a moving surface, said moving surface being provided with control means for differentially affecting radiant energy being propagated from within said wave guide region toward said outlet means, said control means being constituted by the configuration of said moving surface, different radial increments of which are differently spaced from said stationary surface.

20. An antenna system comprising an antenna component and a scanning component, said antenna component including antenna elements, said scanning component having stationary means and rotating means defining therebetween a wave guide region, means for applying radiant energy to said wave guide region at the axis of said rotating means, outlet means connecting increments of said wave guide region to said antenna elements, and control means rotatable with said rotating means in order to repetitively vary the character of the propagation of said radiant energy through said increments of said wave guide region.

21. An antenna construction comprising a distribution of antenna means operatively connected to a distribution of outlet means and wave guide means defining a wave guide region communicating with said outlet means, said wave guide means presenting a stationary surface and a moving surface, said moving surface being provided with control means for differentially affecting radiant energy being propagated from within said wave guide region toward said outlet means, said control means being constituted by incremental dielectric means disposed substantially in the path of radiant energy.

References Cited in the file of this patent

UNITED STATES PATENTS 2,928,087    Parker _____ Mar. 8, 1960